United States Patent Office 3,119,836
Patented Jan. 28, 1964

3,119,836
FLUORINE CONTAINING SULFUR HETERO-
CYCLIC COMPOUNDS AND PROCESS FOR
PREPARING
Carl G. Krespan, Wilmington, Del., assignor to E. I. du
Pont de Nemours and Company, Wilmington, Del.,
a corporation of Delaware
No Drawing. Filed June 23, 1961, Ser. No. 119,025
12 Claims. (Cl. 260—330.5)

This invention relates to a new class of fluorine-containing heterocyclic compounds. More particularly, it relates to compounds containing a fluorine-substituted thiolane nucleus.

In spite of the growing importance of fluorinated organic compounds, only very few fluorine-substituted heterocyclic structures are known. In particular, prior to my U.S. Patent 2,931,803, there were no published reports of fluorine-substituted 5-membered ring structures in which one of the ring members is sulfur.

In my U.S. Patent 2,931,803, there is described the direct, one-step combination of tetrafluoroethylene with sulfur, whereby perfluoroheterocyclic compounds of sulfur are obtained among the reaction products. It has now been found that a similar one-step reaction takes place between tetrafluoroethylene or trifluorochloroethylene, a compound having aromatic unsaturation, and sulfur, whereby there is obtained directly, and from readily available reactants, a fluorine-substituted thiolane, i.e., a fluorine-substituted heterocyclic containing the structure

This application is a continuation-in-part of my copending application Serial No. 722,648, filed March 20, 1958, now abandoned, which in turn was a continuation-in-part of my application Serial No. 678,451, filed August 15, 1957, now U.S. Patent 2,931,803, which was a continuation-in-part of my application Serial No. 595,126, filed July 2, 1956, and now abandoned.

It is an object of this invention to provide a new class of fluorine-containing heterocyclic compounds and a novel process for their preparation. A further object is to provide novel adducts of a perhaloethylene, a compound having aromatic unsaturation, and sulfur, which adducts contain a fluorine-substituted thiolane nucleus. Other objects will appear hereinafter.

These and other objects of this invention are accomplished by providing an adduct of (a) from one to two moles of sulfur, (b) from one to two moles of a perhaloethylene $CF_2=CFX$, wherein X is halogen of atomic number 9–17, and (c) one mole of an unsaturated cyclic compound wherein the unsaturation is solely intracyclic, said cyclic compound having 0–2 substituents, as hereinafter defined, and being an aromatic carbocyclic compound of one to two 6-membered rings or a thiophene. These adducts contain one or two 2,2,3-trifluoro-3-halothiolane nuclei,

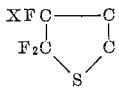

where X is halogen of atomic number 9–17, fused to the nucleus or nuclei of the unsaturated cyclic compound. The invention also comprises the dehydrogenation products of these adducts, said products resulting from the removal of two hydrogen atoms from the pair of annular carbon atoms attached to the trifluoroperhalothioethylene radical, $-S-CF_2-CFX-$.

Otherwise expressed, the products of this invention are polynuclear heterocyclic compounds represented by the general formula

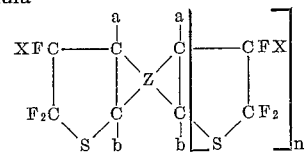

where $n$ is 0 or 1; X is fluorine or chlorine; Z stands for the atomic grouping which, together with the carbon atoms to which it is attached, completes a cyclic structure of the group of (I) a one to two 6-membered carbocyclic structure and (II) the

nucleus, in which cyclic structure each annular carbon atom not attached to the $-S-CF_2-CFX-$ radical is doubly bonded to one other annular carbon atom, any substituent on said cyclic structure being halogen, alkyl of 1 to 4 carbon atoms or alkoxy of 1 to 4 carbon atoms, there being at most two of said substituents on said cyclic structure, i.e., said cyclic structure bears 0–2 substituents, said substituents, if any, being halogen, alkyl or alkoxy; and the valence bonds $a$ and $b$ are satisfied by hydrogen, one of the above-mentioned substituents or a second bond between their respectively depicted annular carbon atoms.

It will be seen that the above-defined products contain one of the cyclic structures

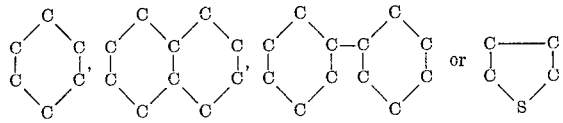

bearing one or two $-S-CF_2-CFX-$ groups attached to one or two separate pairs of adjacent annular carbon atoms.

These compounds are prepared by heating at a temperature within the range of 100 to 300° C. an intimate mixture of (a) sulfur; (b) a perhaloethylene $CF_2=CFX$, where X is halogen of atomic number 9–17, i.e., fluorine or chlorine; and (c) a cyclic compound which can be an aromatic carbocyclic compound of one to two 6-membered rings or a thiophene, said cyclic compound being unsubstituted or bearing from one to two substituents, i.e., said cyclic compound bearing as its sole substituents 0–2 groups, which can be halogen, alkyl of 1 to 4 carbon atoms or alkoxy of 1 to 4 carbon atoms. The principal reaction which takes place in this process is the addition of one or two moles each of the perhaloethylene and sulfur, as the $-S-CF_2-CFX-$ group, to one or two of the annular double bonds of the cyclic compound. When the adduct thus formed has hydrogen atoms attached to the adjacent annular carbon atoms bound to the $-S-CF_2-CFX-$ group or groups, a dehydrogenation reaction sometimes takes place, whereby part at least of the adduct loses these hydrogen atoms, with reformation of an annular double bond between the two carbon atoms. These dehydrogenation products are sometimes not readily separable from the adducts by fractionation, but separation can be effected by other methods such as vapor phase chromatography. However, it is in general unnecessary to separate the two kinds of products.

Since the perhaloethylenes defined above are gaseous, the reaction is conveniently carried out in a sealed, pressure-resistant vessel. The operating pressure is not critical. Normally, the reaction is carried out under the autogenous pressure developed by the reactants at the operating temperature, but an additional pressure of either the perhaloethylene or of an inert gas such as nitrogen can be used if desired. Thus, the total pressure can be as high as the equipment can withstand. For example, it can be as high as 5000 atmospheres or even higher.

The reaction proceeds at an impractically slow rate at temperatures below about 100° C. It is therefore desirable to operate at at least 100° C. and preferably at least 125° C. While the reaction temperature can be as high as the decomposition point of reactants or reaction products, it is in general unnecessary to exceed about 300° C., the preferred temperature range being 125–250° C.

The relative proportions of the three reactants are not critical. They are important only to the extent that it is desired to utilize the more expensive chemicals most efficiently. Generally, the sulfur and the perhaloethylene are used in ratios of between 0.75 and 2.5 moles of perhaloethylene per mole of sulfur, and the cyclic unsaturate is used in amounts of between 0.5 and about 4 moles per mole of sulfur.

A solvent for the reaction is not necessary. However, use can be made if desired of a heat-stable, unpolymerizable, essentially neutral liquid reaction medium free from carbon-to-carbon unsaturation and capable of dissolving the sulfur used to the extent of at least 0.5% at the operating temperature. Suitable solvents include halogenated hydrocarbons such as chloroform or carbon tetrachloride; acylic or cyclic ethers such as di-n-butyl ether, dioxane or tetrahydrofuran; carbon disulfide, dimethylformamide, and the like. Carbon disulfide is the most useful solvent.

The reaction needs no catalyst. In some of the examples which follow, iodine was added to the reaction mixture since it has been found to catalyze the formation of cyclic compounds from sulfur and tetrafluoroethylene as the sole unsaturate. However, the presence of iodine is not necessary, and in fact appears to offer no particular advantage in the reaction of this invention.

Contact between the reactants should be maintained at least long enough at operating temperature for a practical amount of reaction product to be formed. In practice, a reaction period of two to twelve hours in the preferred temperature range is sufficient, but a shorter or longer reaction period can be used.

The products of this reaction are liquids, or crystalline solids, which can be isolated from the reaction mixture by conventional methods, e.g., distillation at atmospheric or reduced pressure, steam distillation, crystallization from an appropriate solvent or the like. When the perhaloethylene is tetrafluoroethylene, there can also be formed small amounts of perfluorothiolane, with possible traces of perfluorodithiane. These compounds are described in my patent already referred to. These by-products, when they are formed, can be separated from the heterocyclic products of this invention by fractional distillation. Polymeric products, e.g., linear tetrafluoroethylene-sulfur copolymers, form frequently. Their separation from the monomeric heterocyclics offers in general no difficulties.

In a typical mode of operating the process, a bomb-type pressure vessel lined with stainless steel is charged with weighed amounts of sulfur, the cyclic unsaturate, and the solvent, if any is used. The bomb is chilled to a low temperature, e.g., that of liquid nitrogen, evacuated free of air, and the desired amount of the perhaloethylene is condensed into it. The bomb is sealed, placed in an agitating rack and heated with shaking at the desired temperature, preferably in the range of 125–250° C., for a given period of time, preferably 2–12 hours. Alternatively, only a portion of the required amount of perhaloethylene is charged in the bomb at the beginning, and the remainder is introduced at intervals during the heating period as the pressure inside the bomb decreases. At the end of the heating period, the bomb is cooled to room temperature or below, if desired, and any unreacted gaseous product is bled out. The liquid reaction product is separated from any solid material which may be present, and fractionated at atmospheric or reduced pressure.

The following examples illustrate the invention.

*Example I*

A mixture of 4.8 g. (0.15 mole) of sulfur, 30.3 g. (0.30 mole) of tetrafluoroethylene, 20 ml. (0.22 mole) of benzene and 1.27 g. (0.005 mole) of iodine, the latter being added to catalyze the formation of perfluorothiolane, was heated at 150° C. for 10 hours under autogenous pressure. Distillation of the liquid product gave a small amount of perfluorothiolane,

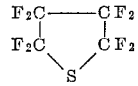

There was also obtained, in 3% conversion based on the sulfur, a product boiling at 95–100° C. at 4 mm. and melting at 72–73° C. after recrystallization from carbon tetrachloride, then from 95% ethanol. This product analyzed as an adduct of two moles of tetrafluoroethylene and two moles of sulfur to one mole of benzene.

*Analysis.*—Calc'd for $C_{10}H_6F_8S_2$: C, 35.09; H, 1.77; F, 44.41; S, 18.74; M.W., 342. Found: C, 34.76; H, 2.12; F, 43.92; S, 18.92; M.W., 300.

Infrared analysis showed that hydrogen was present on saturated and unsaturated carbon, and that carbon-to-carbon unsaturation was present. Nuclear magnetic resonance analysis showed the presence of two similar compounds containing —$CF_2CF_2S$— groups in rings, and also indicated that hydrogen was present on saturated and unsaturated carbon. These data are consistent with a mixture of two of the following three tricyclic compounds:

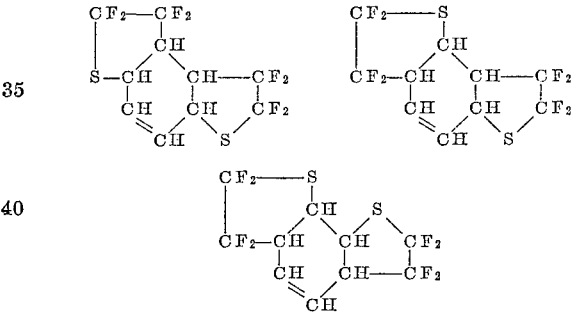

Theoretical considerations suggest that the first two structures are the most probable ones.

*Example II*

The preceding example was essentially repeated, except that a much larger amount of benzene was used. The reactants were used in the following quantities: sulfur, 16 g.; tetrafluoroethylene, 49.6 g.; benzene, 160 ml.; and iodine, 1.27 g. This mixture was heated at 150° C. for 10 hours under autogenous pressure. Distillation of the reaction product gave 3.9 g. of octafluorothiolane, 20.8 g. of the isomeric mixture of tricyclic products described in Example I, and in addition 6.2 g. of a fraction boiling at 40–90° C. at 2 mm. Refractionation of this material gave 4.3 g. of liquid in cuts boiling from 42–65° C. at 4.5 mm. Nuclear magnetic resonance analysis indicated that this product consisted of bicyclic fluorosulfides, of which the lower boiling fraction had the structure

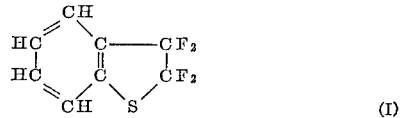

(I)

and the higher boiling fraction was a mixture of (I) with the structure

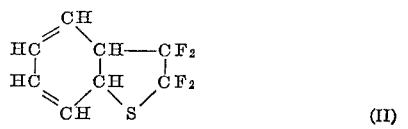

(II)

Presumably, (II) had formed first by addition of tetrafluoroethylene and sulfur to benzene, and had been partly dehydrogenated to (I).

In this and the preceding example, iodine was used as a reaction catalyst. A catalyst is by no means necessary, however. Thus, when the reaction was carried out under essentially the same conditions but without iodine, there was obtained octafluorothiolane in 5% conversion, based on the tetrafluoroethylene, and the isomeric mixture of tricyclic fluorosulfides in 28% conversion, together with a smaller amount of the mixture of bicyclic fluorosulfides described above.

*Example III*

A mixture of 8 g. (0.25 mole) of sulfur, 25 g. (0.25 mole) of tetrafluoroethylene, and 35 g. (0.27 mole) of naphthalene was heated at 150° C. for 5 hours under autogenous pressure. Distillation of the reaction product gave 4.7 g. of a yellow oil boiling at 95–100° C. at 0.7 mm. Analysis of a redistilled sample by nuclear magnetic resonance gave evidence for cyclic structures containing the —CF$_2$—CF$_2$—S— group. Infrared and ultraviolet spectral analysis indicated the presence of a naphthalene nucleus with smaller amounts of a 1,2-dihydronaphthalene nucleus. These data, taken together with the elemental analysis, showed that one mole of tetrafluoroethylene and one mole of sulfur had added to one mole of naphthalene, with partial dehydrogenation of the adduct. On the basis of this evidence, the reaction product contained either or both of the products,

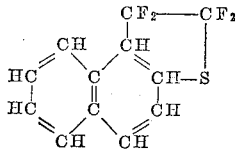

and

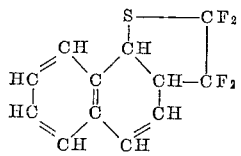

and their dehydrogenation products.

*Analysis.*—Calc'd for C$_{12}$H$_8$F$_4$S: C, 55.38; H, 3.10; F, 29.20; S, 12.32; M.W., 260. Calc'd for C$_{12}$H$_6$F$_4$S: C, 55.81; H, 2.34; F, 29.43; S, 12.42; M.W., 258. Found: C, 55.32; H, 3.11; F, 28.23; S, 12.65; M.W., 236, 238.

*Example IV*

A mixture of 8 g. (0.25 mole) of sulfur, 25 g. (0.25 mole) of tetrafluoroethylene and 26.7 g. (0.32 mole) of thiophene was heated at 150° C. for 3 hours under autogenous pressure. Distillation of the reaction product gave 6.9 g. of yellow oil, B.P., 75–80° C. at 1–2 mm., most of which distilled on refractionation at 52–53° C. at 0.2 mm. This product had the composition C$_8$H$_4$F$_8$S$_3$, showing that one mole of tetrafluoroethylene and one mole of sulfur had added to each of the double bonds of thiophene.

*Analysis.*—Calc'd for C$_8$H$_4$F$_8$S$_3$: C, 27.59; H, 1.16; F, 43.64; S, 27.62; M.W., 348. Found: C, 27.94; H, 1.87; F, 43.74; S, 28.03; M.W., 324.

Infrared analysis showed hydrogen and fluorine bonded to saturated carbon, and no double bond to be present. The nuclear magnetic resonance spectrum indicated the structure

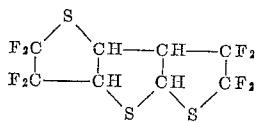

*Example V*

A mixture of 8 g. (0.25 mole) of sulfur, 27.6 g. (0.24 mole) of chlorobenzene and 25 g. (0.25 mole) of tetrafluoroethylene was heated at 150° C. for 11 hours under autogenous pressure. Distillation of the product gave 2.2 g. of octafluorothiolane and 2.9 g. of a light yellow oil, B.P., 105–110° C. at 2 mm., with an odor resembling that of the tricyclic fluorosulfide obtained from benzene (Example I). A redistilled sample, B.P., 86–87° C. at 0.7 mm., was analyzed. Elemental analysis indicated that the product was essentially an adduct of two moles of tetrafluoroethylene and two moles of sulfur to one mole of chlorobenzene.

*Analysis.*—Calc'd for C$_{10}$H$_5$ClF$_8$S$_2$: C, 31.84; H, 1.34; Cl, 9.52; F, 40.30; S, 17.00; M.W., 377. Found: C, 32.33; H, 1.49; Cl, 7.70; F, 41.36; S, 17.66; M.W., 336, 332.

The nuclear magnetic resonance spectrum indicated the presence of a mixture, but it did resemble that of the tricyclic product obtained from benzene. Infrared analysis showed the presence of saturated and unsaturated carbon, aromatic unsaturation and unconjugated unsaturation with chlorine not directly attached to unsaturated carbon. These data indicated that a tricyclic adduct had formed and had partially lost hydrogen chloride and hydrogen to give an aromatized compound, and that the reaction product was a mixture of the following structures:

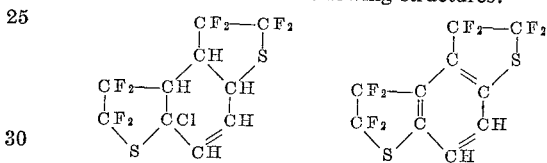

This invention embraces generically the polynuclear heterocyclic compounds containing the 2,2,3-trifluoro-3-halothiolane nucleus obtained by the described reaction of sulfur and tetrafluoroethylene or trifluorochloroethylene with a cyclic compound, as defined, containing an aromatic system of double bonds. Other examples of such polynuclear heterocyclic compounds, in addition to those already illustrated, are listed below. In view of the previously noted uncertainty concerning the geometrical configuration of adducts where two —S—CF$_2$—CFX— groups are attached to the cyclic unsaturate, or where one —S—CF$_2$—CFX— group is attached to a binuclear cyclic unsaturate, the specific reaction products can only be named in terms of the reactants used in their preparation. With each of the named reactant systems, the resulting adduct contains one or two —S—CF$_2$—CFX— groups, i.e., one or two 2,2,3-trifluoro-3-halothiolane nuclei. Furthermore, when the 4- and 5-carbon atoms of these nuclei bear hydrogen atoms, there is often obtained as a by-product the dehydrogenated compound formed on loss of these hydrogen atoms.

Typical products of this invention are obtained from the following reactant systems:

Tetrafluoroethylene, sulfur and toluene
Trifluorochloroethylene, sulfur and p-xylene
Tetrafluoroethylene, sulfur and n-butylbenzene
Tetrafluoroethylene, sulfur and α-propylnaphthalene
Tetrafluoroethylene, sulfur and diphenyl
Trifluorochloroethylene, sulfur and 2-methyldiphenyl
Tetrafluoroethylene, sulfur and 2-methylthiophene
Trifluorochloroethylene, sulfur and β-bromonaphthalene
Tetrafluoroethylene, sulfur and o-dichlorobenzene
Trifluorochloroethylene, sulfur and fluorobenzene
Tetrafluoroethylene, sulfur and p-iodotoluene
Trifluorochloroethylene, sulfur and 2,5-dichlorothiophene
Tetrafluoroethylene, sulfur and phenyl ethyl ether
Tetrafluoroethylene, sulfur and 2-methoxydiphenyl
Tetrafluoroethylene, sulfur and isobutyl β-naphthyl ether
Tetrafluoroethylene, sulfur and 2-methoxythiophene The preferred products of this invention are the adducts of tetrafluoroethylene and sulfur with cyclic unsaturates as previously defined. Particularly preferred are the adducts of tetrafluoroethylene and sulfur with benzene, naphthalene or thiophene and with the monochloro and dichloro derivatives of these compounds.

The heterocyclic compounds of this invention have a variety of uses. As a class, they are characterized by good stability towards heat, oxygen and light. This inertness makes them useful as heat exchange fluids, either in the gaseous state or in the liquid state. In the latter case, the products which are normally solid can be used as melts, as well as the products which are normally liquid.

Another characteristic of the class is the high solvent power for a wide variety of compounds which its members possess. This property makes them useful as stable solvents. A specific illustration of this solvent power is the ability of these products to remove grease and oil from metals, textiles and other solid objects, when used in the vapor or in the liquid phase. For this purpose the normally solid products, such as the adduct of Example I, can be used as melts.

Since the heterocyclic products of this invention contain at least four halogen atoms, they are as a class difficultly combustible. Those which are sufficiently rich in halogen do not support combustion. For example, the adducts of Examples I and V extinguish a burning cotton wad soaked in xylene when sprayed on the fire. Such products are useful as fire retardants or fire-extinguishing materials, and provide safe solvents for use, for example, in insecticidal compositions, aerosol bombs, and the like.

Another property possessed by the products of this invention as a class is biological activity towards the lower forms of life. This property manifests itself principally in the control of fungi and bacteria. These compounds are therefore useful as active ingredients of compositions for agricultural uses involving such control. For example, the benzene/sulfur/tetrafluoroethylene adduct of Example I is a fungicide active against apple scab, and the thiophene/sulfur/tetrafluoroethylene adduct of Example IV shows very good control of apple scab and is a soil fungicide and nematocide.

Since obvious modifications and equivalents in the invention will be evident to those skilled in the chemical arts, I propose to be bound solely by the appended claims.

The embodiments of the invention in which an exclusive property or privilege is claimed are defined as follows:

1. An adduct of (a) 1–2 moles of sulfur, (b) 1–2 moles of a perhaloethylene of the formula $CF_2=CFX$, wherein X is halogen of atomic number 9–17, and (c) one mole of an unsaturated cyclic compound selected from the group consisting of unsubstituted aromatic carbocyclic of one to two 6-membered rings, thiophene, substituted aromatic carbocyclic of one to two 6-membered rings, and substituted thiophene, said substituted compounds bearing as their sole substituents 1–2 members selected from the group consisting of halogen, alkyl of 1–4 carbons and alkoxy of 1–4 carbons.

2. An adduct of claim 1 wherein the perhaloethylene is tetrafluoroethylene and the cyclic compound is benzene.

3. An adduct of claim 1 wherein the perhaloethylene is tetrafluoroethylene and the cyclic compound is naphthalene.

4. An adduct of claim 1 wherein the perhaloethylene is tetrafluoroethylene and the cyclic compound is thiophene.

5. An adduct of claim 1 wherein the perhaloethylene is tetrafluoroethylene and the cyclic compound is chlorobenzene.

6. The dehydrogenation products of the adducts of claim 1, said products resulting from the loss of two hydrogen atoms from every pair of annular carbon atoms bonded to a trifluoroperhalothioethylene radical formed by the sulfur and perhaloethylene in said adduct.

7. A process of preparing polynuclear heterocyclic compounds in which sulfur is the hetero atom comprising heating at at temperature of 100–300° C. an intimate mixture of (a) sulfur; (b) a perhaloethylene of the formula $CF_2=CFX$, wherein F is halogen of atomic number 9–17; and (c) a cyclic compound selected from the group consisting of unsubstituted aromatic carbocyclic of one to two 6-membered rings, thiophene, substituted aromatic carbocyclic of one to two 6-membered rings, and substituted thiophene, said substituted compounds bearing as their sole substituents 1–2 members selected from the group consisting of halogen, alkyl of 1–4 carbons and alkoxy of 1–4 carbons.

8. The process of claim 7 wherein the perhaloethylene is tetrafluoroethylene and the cyclic compound is benzene.

9. The process of claim 7 wherein the perhaloethylene is tetrafluoroethylene and the cyclic compound is naphthalene.

10. The process of claim 7 wherein the perhaloethylene is tetrafluoroethylene and the cyclic compound is thiophene.

11. The process of claim 7 wherein the perhaloethylene is tetrafluoroethylene and the cyclic compound is chlorobenzene.

12. The process of claim 7 wherein the heating is under autogenous pressure at 125–250° C.

References Cited in the file of this patent
UNITED STATES PATENTS
2,931,803   Krespan _____ Apr. 5, 1960

UNITED STATES PATENT OFFICE
CERTIFICATE OF CORRECTION

Patent No. 3,119,836                         January 28, 1964

Carl G. Krespan

It is hereby certified that error appears in the above numbered patent requiring correction and that the said Letters Patent should read as corrected below.

Column 8, line 25, for "at", second occurrence, read -- a --; line 27, for "F", third occurrence, read -- X --.

Signed and sealed this 23rd day of June 1964.

(SEAL)
Attest:

ERNEST W. SWIDER                             EDWARD J. BRENNER
Attesting Officer                                  Commissioner of Patents